(12) United States Patent
Murai et al.

(10) Patent No.: US 6,981,770 B2
(45) Date of Patent: Jan. 3, 2006

(54) LCD PROJECTOR

(75) Inventors: Tatsuo Murai, Machida (JP); Machiko Takahashi, Musashino (JP); Takeshi Katayama, Yokohama (JP); Mikiharu Kuwata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/775,237

(22) Filed: Feb. 11, 2004

(65) Prior Publication Data

US 2005/0062938 A1    Mar. 24, 2005

(30) Foreign Application Priority Data

Sep. 19, 2003  (JP)  ............... 2003-328558

(51) Int. Cl.
*G03B 21/16* (2006.01)
*F21V 29/00* (2006.01)
*G02F 1/1333* (2006.01)

(52) U.S. Cl. .................. 353/61; 353/57; 353/119; 362/294; 362/373; 349/161

(58) Field of Classification Search .............. 353/61, 353/31, 52, 57, 58, 60, 87, 119, 122; 362/294, 362/345, 362, 373; 361/695; 349/161

See application file for complete search history.

(56) References Cited

U.S. PATENT DOCUMENTS

| 5,713,652 | A * | 2/1998 | Zavracky et al. ............ 353/122 |
| 5,951,136 | A * | 9/1999 | Furuhata et al. .............. 353/31 |
| 6,481,855 | B2 * | 11/2002 | Oehler ......................... 353/70 |
| 2003/0202160 | A1 * | 10/2003 | Chimura et al. .............. 353/52 |
| 2004/0141155 | A1 * | 7/2004 | Wang et al. ................... 353/61 |

FOREIGN PATENT DOCUMENTS

| JP | 2000-66306 | 8/1998 |
| JP | 2002-40562 | 7/2000 |
| JP | 2002-122939 | 10/2000 |
| JP | 2002-148582 | 11/2000 |
| JP | 2002-311505 | 4/2001 |

* cited by examiner

*Primary Examiner*—David Gray
*Assistant Examiner*—Rochelle Blackman
(74) *Attorney, Agent, or Firm*—Reed Smith LLP; Stanley P. Fisher, Esq.; Juan Carlos A. Marquez, Esq.

(57) ABSTRACT

A liquid crystal projector comprises an equipment body containing projection device and cooling device and including an air intake port and an air exhaust port, a case for housing the equipment body, and a sliding device for sliding the case so as to take a first state in which the equipment body is pulled out of the case and a second state in which the equipment body is housed in the case. The air intake port and the air exhaust port are closed at the first state and are opened outside at the second state.

7 Claims, 15 Drawing Sheets

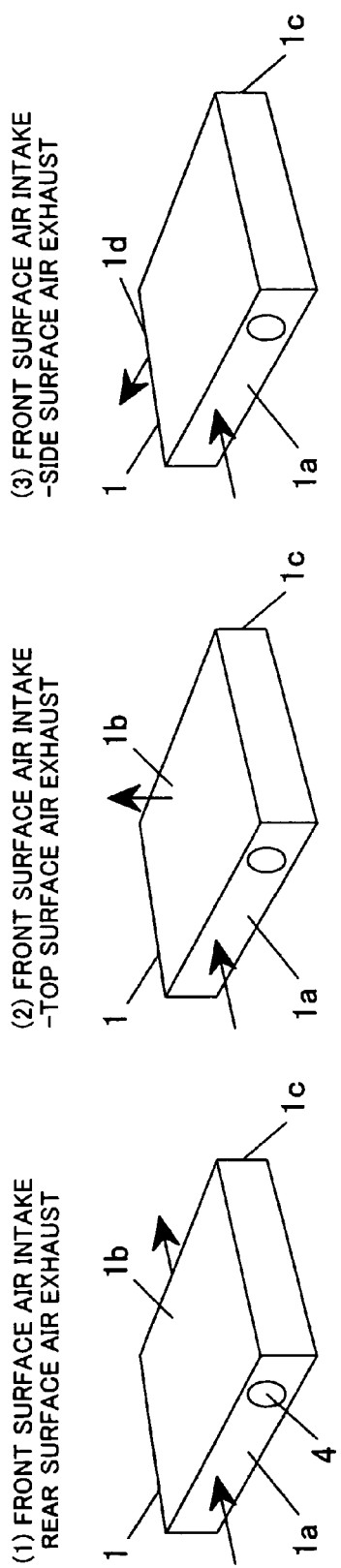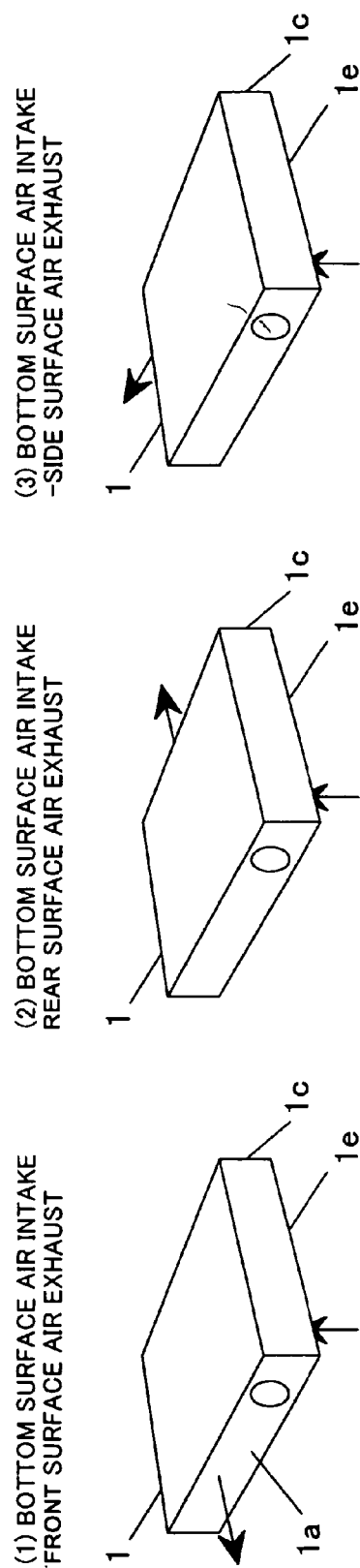

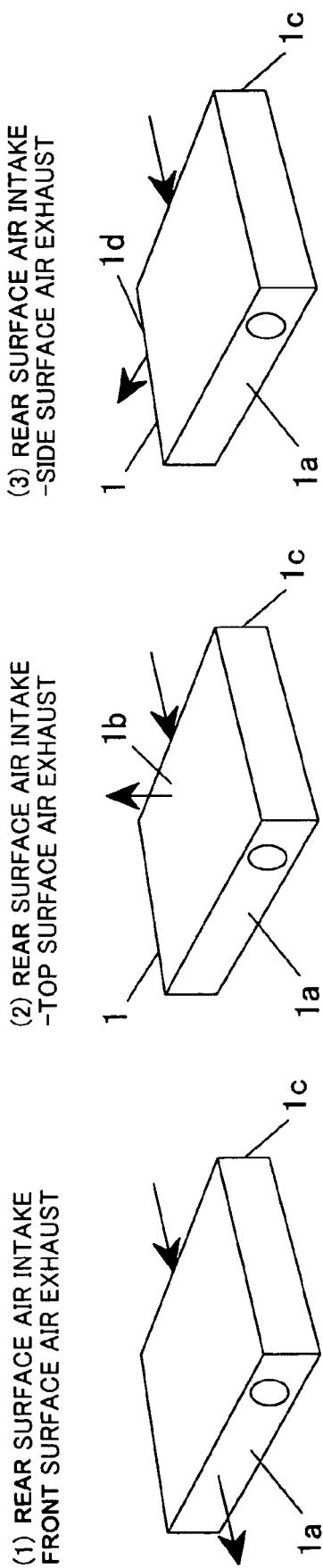

LCD PROJECTOR

BACKGROUND OF THE INVENTION

The present invention relates to a liquid crystal projector which contains cooling means and in which noise due to a ventilation fan of the cooling means is reduced.

In a liquid crystal projector which magnifies and projects on a screen an image imaged on a liquid crystal panel, a high-illuminant high-voltage discharge lamp is used as a light source for illumination of a liquid crystal panel in order to obtain a high brightness projection image. The lamp emits high intensity thermal radiation, so, the vicinity of the lamp and the liquid crystal panel become high temperature, and an inner side of a housing of the liquid crystal projector (hereinafter, referred to as equipment housing) also becomes high temperature. Thus, the characteristics of each components may be adversely effected. Therefore, cooling means including a ventilation fan is provided in such a equipment housing, which, using the ventilation fan, intakes cool air from outside, passes it through the equipment housing, and exhausts it outside to radiate the heat generated in the equipment housing, outside.

In such a situation, if such cooling means is provided in the equipment housing, there has been a problem of noise occurring during use of the liquid crystal projector, because the hissing sound of the ventilation fan, or the sound of rotation of a motor driving the ventilation fan is emitted outside as a noise from an air exhaust port provided in the equipment housing. Conventionally, various methods for preventing such a noise have been proposed.

One of these methods involves setting ventilation fans to predetermined positions in the equipment housing to reduce noise emitted from an air intake port or an air exhaust port (for example, refer to JP-A-2002-40562).

Conventionally, the fan for air intake or air exhaust is provided near the air intake port or air exhaust port, but, in this method, these fans are provided apart from the air intake port or the air exhaust port by prescribed distances (for example, equal to or greater than the diameters of rotation portion of these ventilation fans multiplied by 0.4). In addition, ducts are provided between the air intake port and the air intake fan or between the air exhaust port and the air exhaust fan, and sound absorbing material on an inner surface of the ducts to further reduce the noise.

Another method proposed is to emit noise from the air exhaust port provided in the equipment housing, wherein the emitting direction can be set to any arbitrary direction (for example, refer to JP-A-2000-660306).

This method involves providing a duct in the air exhaust port on an external surface of the equipment housing, wherein the direction of the duct end can be changed. Thus, by turning the duct end to a direction where no viewer is present, air is exhausted and noise is also emitted in the direction so that no viewer would be bothered with noise.

Though the art described in JP-A-2002-40562 can reduce the noise of ventilation fans, since these ventilation fans, an air intake fan and air exhaust fan, are provided apart from the air intake port and the air exhaust port by prescribed distances, there are spaces in the equipment housing between the air intake fan and the air intake port on the inner side where the air intake port is provided, and also between the air exhaust fan and the air exhaust port on the inner side where the air exhaust port is provided. Such spaces are provided only for noise suppression, resulting in a large size of the equipment housing on account of only noise suppression. Therefore, when the liquid crystal projector is stored upon being unused, it requires larger storage space and also becomes bulky, being inconvenient to carry.

In addition, the art described in JP-A-2000-66306 can suppress noise without enlarging equipment housing itself, but, a duct is attached to the equipment housing with a shape protruding from the equipment housing, therefore, when the liquid crystal projector is stored or carried, the duct becomes an obstacle, so, the equipment being inconvenient.

An object of the present invention is to provide a liquid crystal projector which eliminates these problems, effectively reduces the noise emitted from cooling means, and can be small to be handled easily.

SUMMARY OF THE INVENTION

To achieve the above object, according to the present invention, a liquid crystal projector is provided which contains projection means and cooling means, and includes an equipment body which has an air intake port and an air exhaust port, a case for housing the equipment body, and a sliding device sliding the case to a pulled out state in which the equipment body is pulled out from the case and to a retracted state in which the equipment body is retracted into the case, and wherein the air intake port and the air exhaust port are closed with the equipment body retracted, and opened with the equipment body pulled out.

The air intake port is provided on a bottom surface and the air exhaust port is provided on a back side of the equipment body, respectively. Means for closing and opening the air intake port comprises intake ventilation holes, which are provided on a bottom surface of the case, align with the air intake port when the projector is used and does not align with the air intake port when the projector is not used. Means for closing and opening the air exhaust port comprises exhaust ventilation holes, which are provided on a top surface of the case, are closed by the equipment body when the projector is not used, and opened by the closing of the equipment body being released when the projector is used.

The projector further comprises an attitude control legs which can be brought into and out of the equipment body on a front side of the bottom surface of the equipment body, a lock mechanism for locking and unlocking the attitude control legs, and release buttons for operating the lock mechanism by pushing operation to release the locked state of the attitude control legs, wherein the release buttons are provided on the equipment body so that the buttons are pushed by the case when the projector is not used and are released from the pushing by the case when the projector is used.

According to the present invention, it is possible to make the whole of projector small and it easy to be handled at least when it is used, and further, it is possible to reduce the effect of the noise emitted from the ventilation holes provided for cooling the inside of the projector.

BRIEF DESCRIPTION OF THE DRAWINGS

FIG. 8 is schematic perspective views showing other examples of air intake direction and air exhaust direction;

DETAILED DESCRIPTION OF THE INVENTION

Embodiments of the present invention will now be described with reference to the drawings.

Figure 1A:
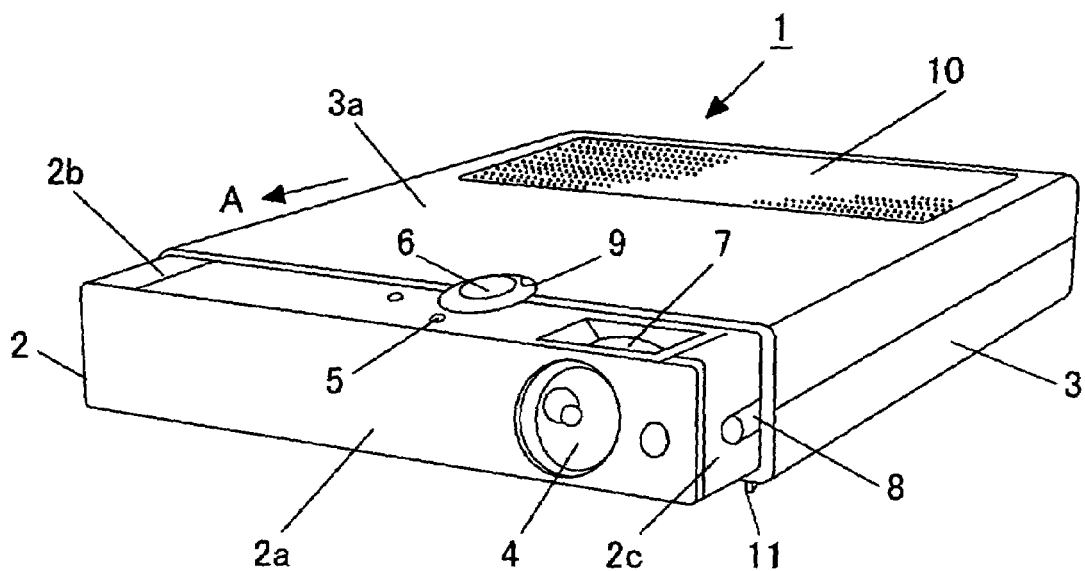
FIG. 1 is perspective views of a first embodiment of a liquid crystal projector according to the present invention, viewed from a top side; wherein (a) shows a state when the projector is used and (b) shows a state when the projector is not used.
Figure 1B:
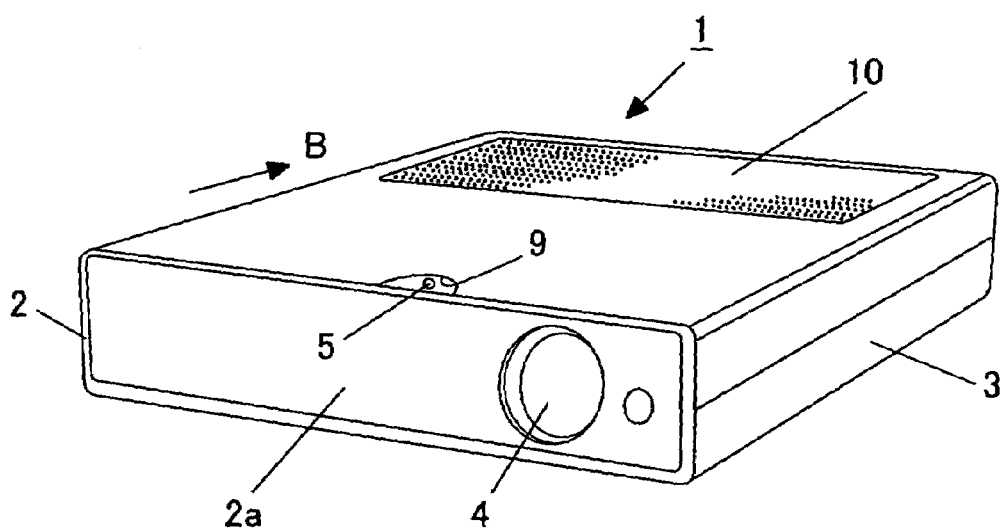

FIG. 1 is a front perspective view illustrating a first embodiment of a liquid crystal projector according to the present invention, in which FIG. 1(a) shows a state when the projector is used, and FIG. 1(b) shows a state when the projector is not used. Reference numeral 1 denotes a liquid crystal projector according to the first embodiment. Reference numeral 2 denotes an equipment body, 2a a front surface, 2b a top surface, and 2c side surfaces. Reference numeral 3 denotes a case, 3a a top surface, 4 a projection lens, 5 a start button, 6 an operation key, 7 a lens knob, 8 release buttons, 9 a recess, 10 exhaust ventilation holes, and 11 attitude control legs.

The liquid crystal projector 1 comprises the equipment body 2 and the case 3, and the equipment body 2 is assembled into the case 3 to form a structure in which the equipment body 2 and the case 3 are slidable relative to one another.

When the liquid crystal projector 1 is used, a part of the front surface side is protruded from the case 3. The start button 5 and the operation key 6 are provided on the top surface 2b of the protruded part of the equipment body 2, thus they are in an operative state. The operation key 6 has a circular shape and the top surface is flush with the top surface 2b of the equipment body 2, a generally semicircular part is positioned in the circular recess 9 formed in a front edge of the top surface 3a of the case 3. That is, because of the existence of the recess, the whole of operation key 6 is exposed outside thus allowed to be operated 9.

A recess with the projection lens 4 is also provided on the right side of the front surface 2a of the equipment body 2, and a recess with the lens knob 7 for focusing or zooming of the projection lens 4 is formed on the top surface 2b of the equipment body 2.

Further, as described below, the release button 8 for unlocking the attitude control legs 11 protruding from the bottom surface of the equipment body 2 to downward through the bottom surface of the case 3 is provided on the part of side surface 2c of the equipment body 2 exposed from the case 3, and s similar release button 8 is provided on another side surface (not shown) opposite to the side surface 2c. When these release buttons 8 are pushed into, the attitude control legs 11 are released from the locked state, and, by a mechanism described below, they tend to protrude further from the equipment body 2. Thus, the height of the front surface 2a of the equipment body 2 of the liquid crystal projector 1 can be adjusted to control the attitude of the liquid crystal projector 1, by pushing the equipment body 2 from the front surface 2b to the mounting plane of the liquid crystal projector with the release button pushed, or loosing the pushing. One of the two attitude control legs alone can be controlled in the height by the above adjustment with the release button 8 of one side surface 2c of the equipment body pushed, and the liquid crystal projector 1 can take a corresponding attitude.

The rear surface (opposite side to the front surface 2a of the equipment body 2) has no wall and is open to the outside, though it cannot be shown because it is in the case 3.

The exhaust ventilation holes 10 are provided on the top surface 3a of the case 3 at a rear side portion.

When the case 3 is pushed in the direction of arrow A in the above state of the liquid crystal projector 1, the equipment body 2 is inserted into the case 3. At the same time, the release buttons 8 of the both side surfaces 2c of the equipment body 2 are pushed into the equipment body 2 by the inner surface of the case 3, whereby the lock of the attitude control legs 11 are released. Further, as the equipment body 2 is inserted further into the case 3, the attitude control legs 11 are pushed into the equipment body 2 by an inner bottom surface of the case 3, and as shown in FIG. 1(b), the whole of equipment body 2 is inserted into the case 3 with only the front surface 2a exposed outside. This state is the state when the liquid crystal projector 1 is not used and it becomes smaller in comparison with the state when the projector 1 is not used as shown in FIG. 1(a).

In this "not used state", the attitude control legs 11 are pushed into the equipment body 2 by the case 3, and only the start button 5 provided on the top surface 2b of the equipment body 2 is exposed outside from the recess 9 provided on the top surface 3a of the case 3.

Thus, when the liquid crystal projector 1 having been in use is collapsed for carrying, or stored, by retracting the equipment body 2 into the case 3, the release buttons 8 are pushed by the case 3 to unlock the attitude control legs 11 and the attitude control legs 11 are retracted into the equipment body 2 by the case 3. On the other hand, when the liquid crystal projector 1 is brought into service, the equipment body 2 is pulled out from the case 3 only by operating the start button 5, and at the same time, the attitude control legs 11 emerge from the equipment body. Accordingly, it is not necessary to retract and pull out the attitude control legs 11, thereby making the liquid crystal projector 1 easy to be handled.

When the start button 5 of the equipment body 2 is pushed in an used state, the liquid crystal projector 1 is powered on, and at the same time, the case 3 travels in a direction towards the rear surface (direction shown by the arrow B) with respect to the equipment body 2. As the case 3 travels, the front surface 2a of the equipment body 2 protrudes from the case 3. During the travel, the release buttons 8 are being pushed by the inner side surfaces of the case 3, and the attitude control legs 11, stored in the equipment body 2 by the inner bottom surface of the case 3, protrudes outside from the bottom of the equipment body 2 through the bottom of the case 3.

When the travel of the case 3 is completed, the equipment body 2 is in maximum protrusion allowed by the case 3, which is the in-use state as shown in FIG. 1(a).

Figure 2:
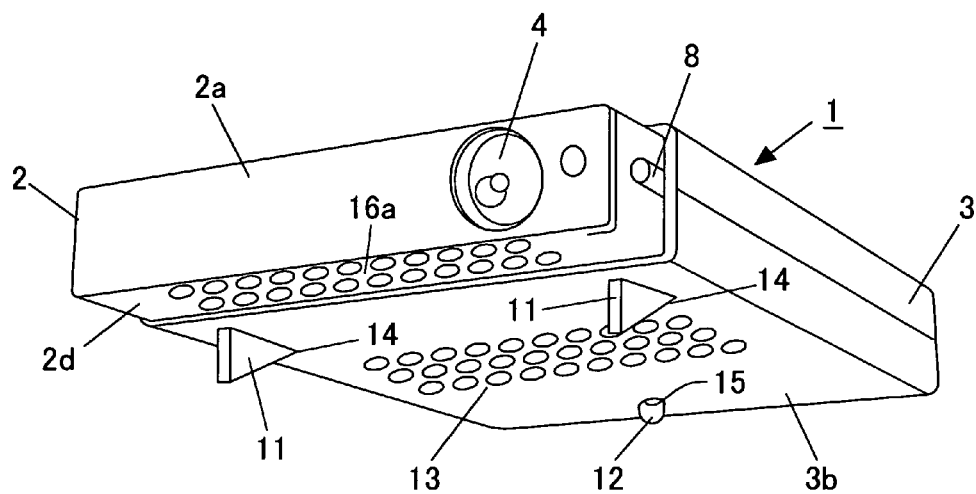
FIG. 2 is a perspective view of the first embodiment, viewed from a bottom side.

FIG. 2 is a perspective view of the liquid crystal projector 1 according to the first embodiment viewed from the bottom surface. Reference number 2d denotes a bottom surface of the equipment body 2, 3b a bottom of the case 3, 12 a reference leg, 13 intake ventilation holes, 14 openings, 15 a through hole, and 16a air intake ports. Parts corresponding to FIG. 1 are designated by the same references, eliminating duplicated descriptions.

A protruding area of the bottom surface 2d of the equipment body 2 from the case 3 is provided with the air intake ports 16a of cooling means (not shown) contained in the equipment body 2. Further, similar air intake ports 16b are also provided in an area of the bottom surface 2d of the equipment body 2, which is in the case 3 and cannot be shown.

Openings 14 are provided on the bottom 3b of the case 3 at both sides of the front side. As shown in the drawing, when the liquid crystal projector 1 is in use, the attitude control legs 11 protrude through the openings 14. Further, the intake ventilation holes 13 are provided on the bottom 3b, and, in the used state, communicate with the air intake ports 16b provided in the bottom surface 2d of the equipment body 2 at the portion in the case 3.

Then, in the used state, by the ventilation fan of the cooling means, not shown, in the equipment body, 2 cool air is sucked into the equipment body 2 from the air intake ports 16a of the equipment body 2 at the area exposed from the case 3, and from the intake ventilation holes 13 on the bottom 3b of the case 3 and the air intake ports 16b, not shown, on the bottom surface 2d of the equipment body 2. At the same time, air is exhausted out of the equipment body 2 from the opened rear surface of the equipment body 2 through the exhaust ventilation holes 10 on the top 3a of the case 3.

In addition, when the liquid crystal projector 1 is not used as shown in FIG. 1(b), the air intake ports 16a, 16b provided on the bottom surface 2d of the equipment body 2, are closed by the case 3, and the exhaust ventilation holes 10 on the top 3a of the case 3 are closed by the top surface 2a of the equipment body 2.

In addition, one through hole 15 is provided in the bottom 3b of the case 3 at a center of a rear side portion, and the reference leg 12 protrudes from the bottom surface 2d of the equipment body 2 through the through hole 15. The extension height of the reference leg 12 from the through hole 15 is constant, so the height of the rear side of the liquid crystal projector 1 is kept constant by the reference leg 12, so that, for example, even if it is set in any attitude by the attitude control leg 11, the bottom 3b of the case 3 does not come into contact with a surface on which the liquid crystal projector 1 is mounted. As shown in the drawing, when the liquid crystal projector 1 is in the used state, the reference leg 12 protrudes through the through hole 15, but, as the equipment body 2 is inserted into the case 3, it is pushed into the equipment body 2 by the case 3. Therefore, in the not used state as shown in FIG. 1(b), neither the attitude control legs 11 nor the reference leg 12 protrude from the bottom 3b of the case 3.

Figure 3:
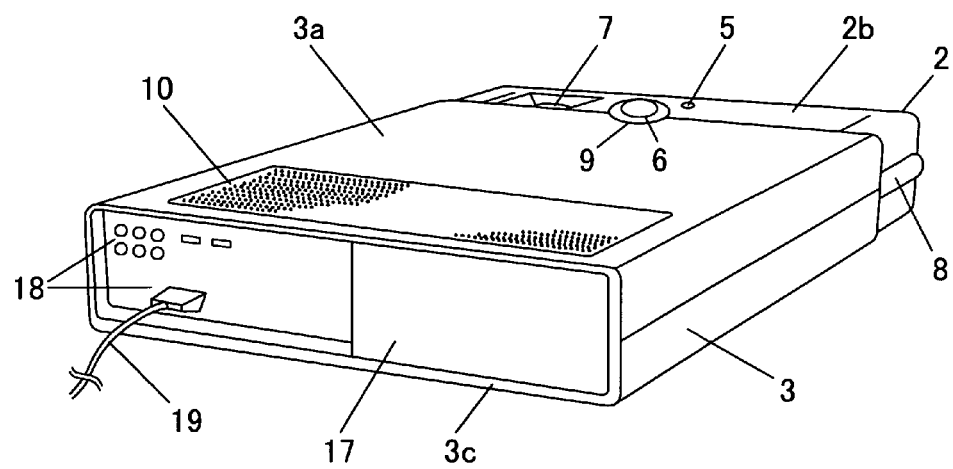
FIG. 3 is a perspective view of the first embodiment, viewed from a rear side.

FIG. 3 is a perspective view of the liquid crystal projector 1 according to the first embodiment viewed from the rear side. Reference number 3c denotes a rear surface of the case 3, 18 various types of connectors, 17 a slide door, and 19 a power cord. Parts corresponding to FIG. 1 are designated by the same references, eliminating duplicated descriptions.

Various types of connectors 18 for connecting a power cord image source, and so on, are provided on a rear surface side of the case 3 in a location that can be opened and closed by the slide door 17 so that when the liquid crystal projector 1 is in the used state, it can be connected to the power cord 19 etc. In the not used state, the locations are closed by the slide door 17 so that various types of connectors 18 do not remain exposed outside.

Figure 4:
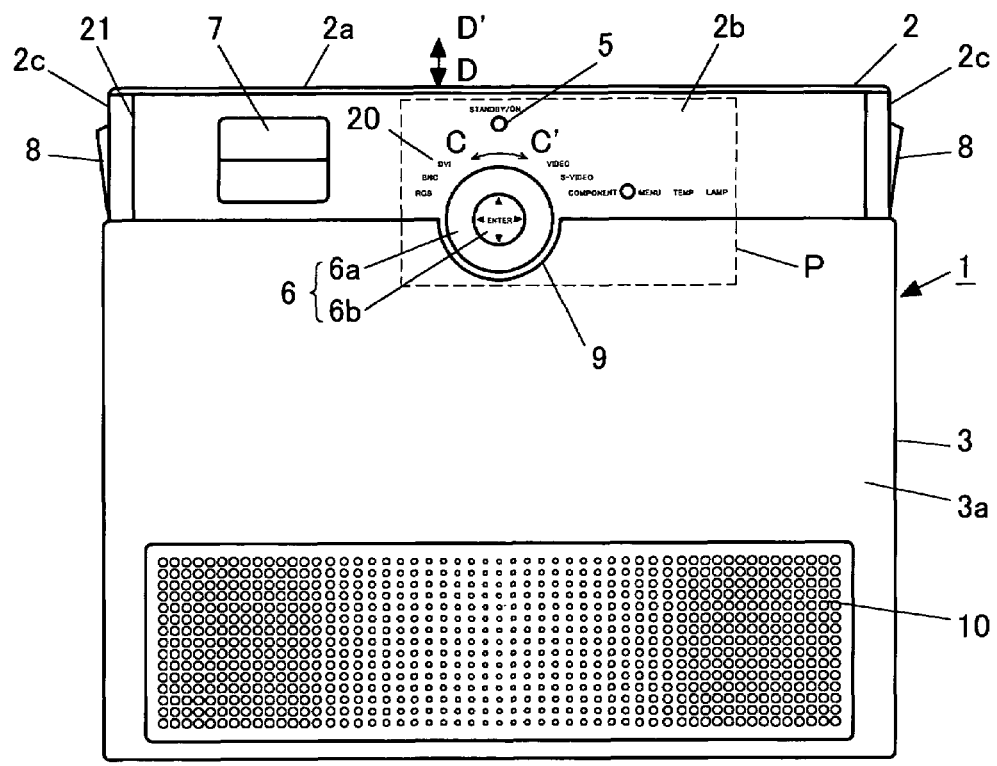
FIG. 4 is a plan view of the first embodiment, viewed from the top side.

FIG. 4 is a plan view of the liquid crystal projector 1, in the used state shown in FIG. 1 to FIG. 3, viewed from the top side. Reference number 6a denotes a jog dial, 6b a cursor key, 20 a picture source name, and 21 a transparent cover. Parts corresponding to the parts shown in the above-described drawings are designated by the same references, eliminating duplicated descriptions.

The operation key 6 comprises a disk-shaped cursor key 6b disposed centrally and a ring-shaped jog dial 6a disposed around the key. The cursor key 6b is provided with triangle marks indicating up and down and right and left. The cursor on the screen, not shown, on which an image is projected, can be moved up and down and right and left by pushing any one of the marks. In addition, the jog dial 6a is used for selectively switching the picture sources of the liquid crystal projector 1, and by rotating it to the direction of arrow C, C' around the center, a desired image source can be chosen, and the expanded image from the source can be projected on the screen, not shown. For this selection, image source names 20 indicating the image sources are displayed around the jog dial 6a on the top surface 2b of the equipment body 2.

Figure 5:
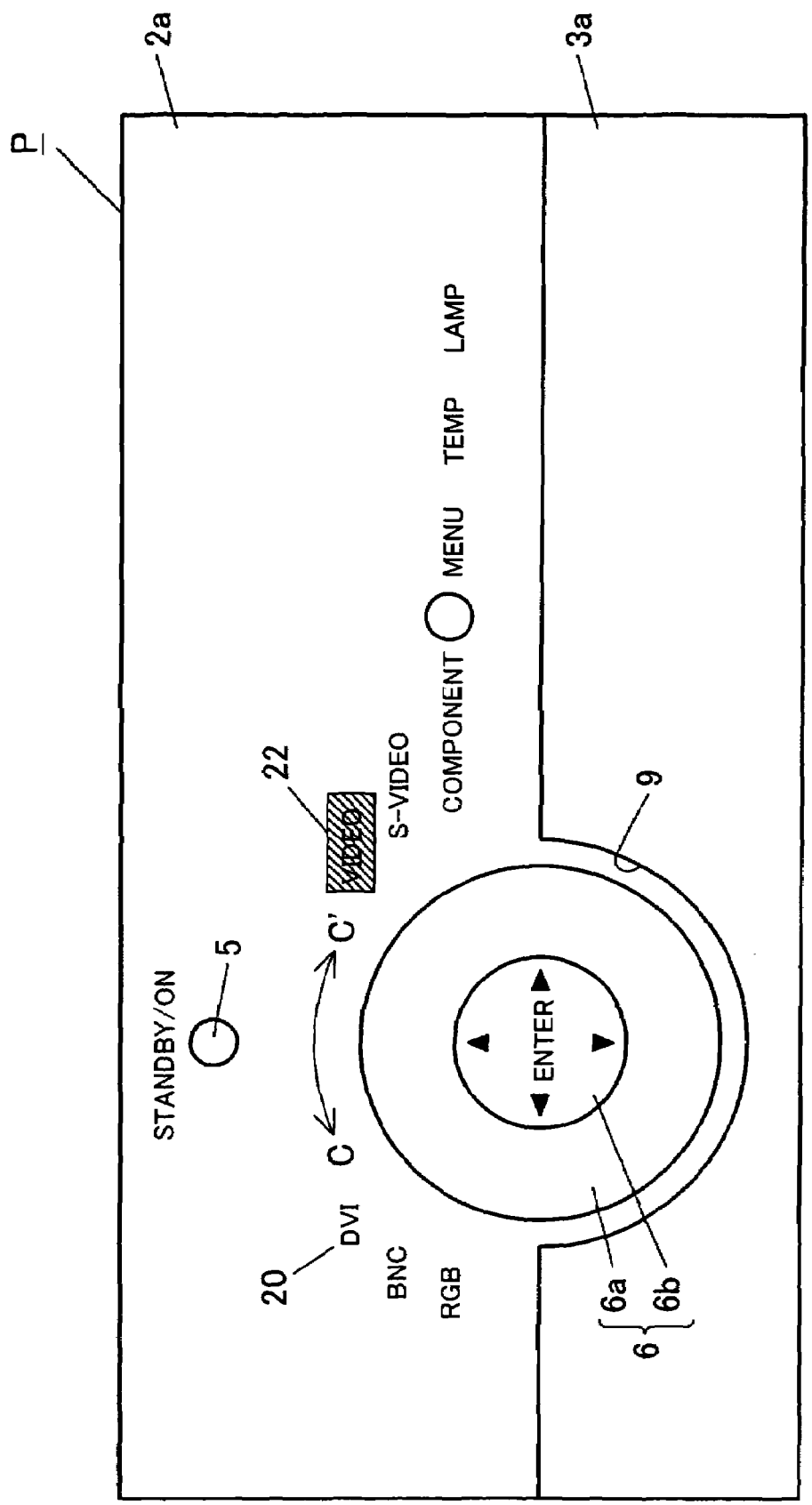
FIG. 5 is an enlarged view showing an area P in FIG. 4.

FIG. 5 is an enlarged view showing an area P in FIG. 4 including the operation key 6. As shown in the drawing, image source names 20 indicating the image source types, such as TV set, video, and personal computer, are displayed around the jog dial 6a. The image source name 20 chosen by the jog dial 6a is lighted by the lighting of a display device such as EL (electro luminescence) device provided for the name, and clearly shown by the lighted cursor 22. Therefore, when the jog dial 6a is rotated, the lighted cursor 22 moves correspondingly, and when the operation of the jog dial 6a is completed, the lighted cursor 22 stops at the location of the image source name 20 correspondingly, indicating that the image source name 20 is chosen.

Returning to FIG. 4, a transparent cover 21 is provided removably from the top surface part of the equipment body 2, which protrudes from the case 3, and a sheet, on which character string such as an image source name 20 etc. and decoration such as a pattern, a figure, and a photograph are printed, is fitted between the transparent cover 21 and the top surface 2b. Of course, the transparent cover 21 and the sheet are removed at the parts of the lens knob 7, the operation key 6, and the start button 5, so that they are easily handled. The sheet can be replaced by removing the transparent cover 21 from the top surface 2a, and thereby the decoration on the top surface 2b of the equipment body 2 can be replaced.

Figure 6:
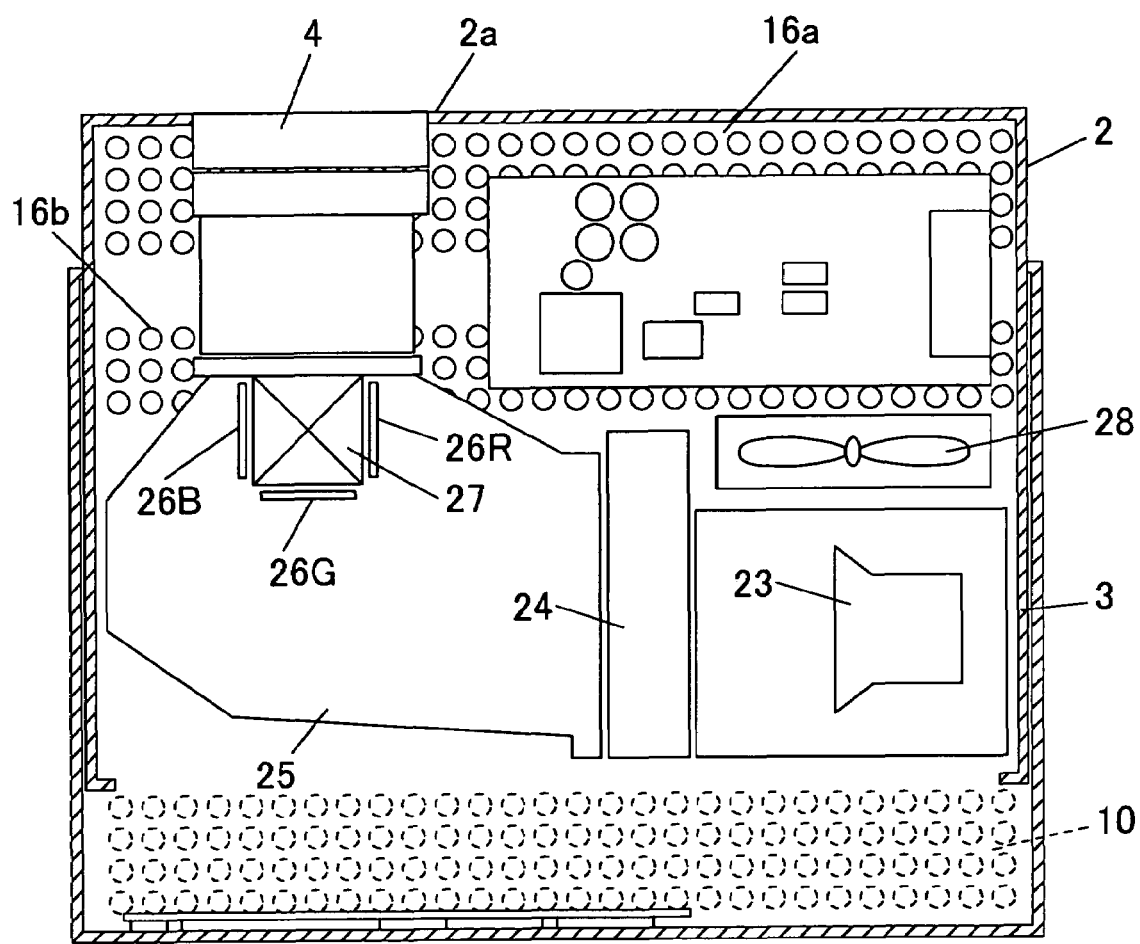
FIG. 6 is a horizontal sectional view showing an example of a schematic internal configuration of the first embodiment.

FIG. 6 is a horizontal sectional view showing an example of a schematic inner structure of the liquid crystal projector 1 according to the first embodiment. Reference number 23 denotes a high voltage discharge lamp, 24 a collimating lens, 25 an optical path, 26R, 26G, and 26B liquid crystal panels, 27 a dichroic prism, and 28 a ventilation fan of the cooling means. Parts corresponding to the parts shown in the above-described drawings are designated by the same references, eliminating duplicated descriptions.

The equipment body 2 is provided with a projection mechanism and the cooling means. The projection mechanism comprises a high-voltage discharge lamp 23 as a light source for lighting, a collimating lens 24 for converting the white light from the high-voltage discharge lamp 23 into collimated light, a liquid crystal panel 26R for imaging a R(red color) image, a liquid crystal panel 26G for imaging a G(green color) image, a liquid crystal panel 26B for imaging a B(blue color) image, an optical path 25 for separating the collimated light from the collimating lens 24 into primary lights of R, G, and B, and guiding the lights to the liquid crystal panels 26R, 26G, and 26B, respectively, a dichroic prism 27 for combining the R, G, B image lights modulated by the images of the liquid crystal panels 26R, 26G, and 26B to generate a color image light, and a projection lens 4 for expanding and projecting a color image on the screen, not shown, on which the color image light enters.

In addition, when the liquid crystal projector 1 is in the used state, the cooling means sucks cool air into the equipment body 2 from the air intake ports 16a, 16b by rotating the ventilation fan 28, passes it through the surrounding of the projection mechanism and exhausts it from the opened rear surface of the equipment body 2, and further exhausts it outside through the exhaust ventilation holes 10 provided on the top of the case 3. Thereby, the heat generated from heating elements such as the high-voltage discharge lamp 23 and the liquid crystal panels 26R, 26G, and 26B is absorbed by the air and emitted outside together with the air through the exhaust ventilation holes 10, thus, the inner side of the equipment body 2 is cooled. In addition, in FIG. 6, the position of the ventilation fan 28 is provisionally, so, the position can be determined appropriately.

Figure 7A:
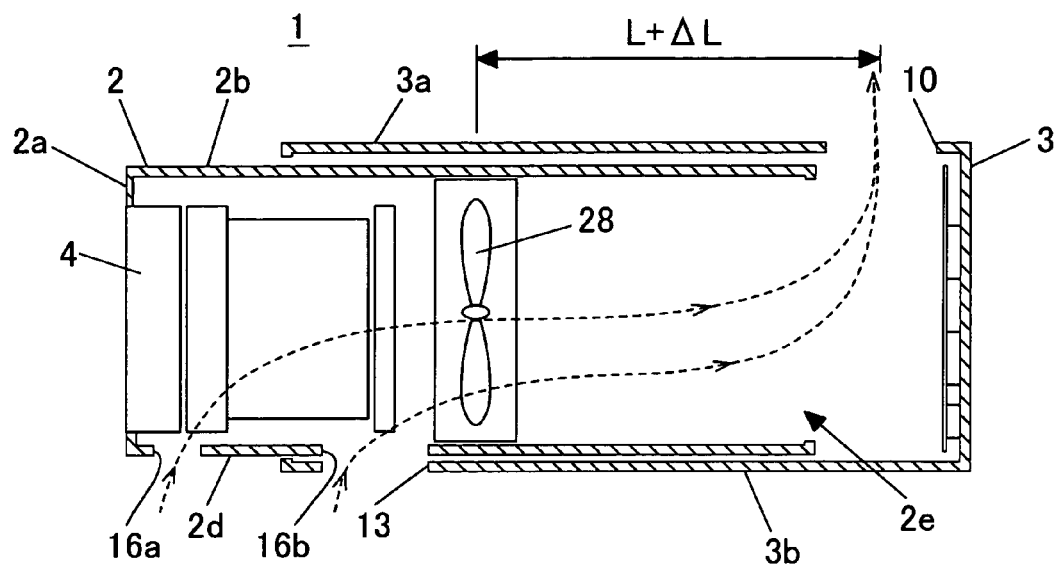
FIG. 7 is views showing comparatively the positions of a ventilation fan in a case of the first embodiment; (a) shows a state when the projector is used and (b) shows a state when the projector is not used.
Figure 7B:
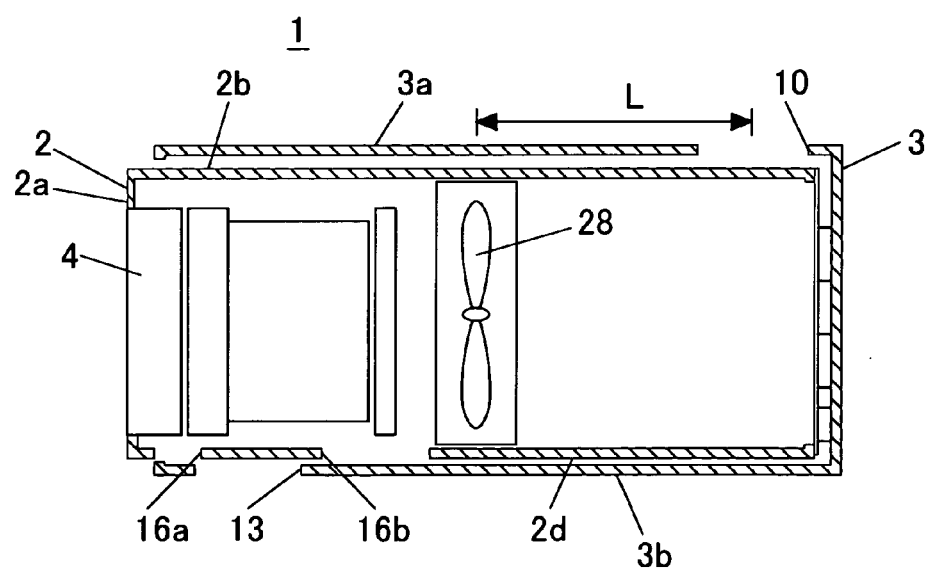

FIG. 7 is views showing comparatively the positions of the ventilation fans 28 in the case 3, between in the used state and in the not used state. FIG. 7(a) is a longitudinal sectional view in the used state, being the same as FIG. 1(a) and FIG. 2. FIG. 7(b) is a longitudinal sectional view in the not used state, being the same as FIG. 1(b). Reference number 2e denotes a rear side of the equipment body 2. Parts corresponding to the parts shown in the above-described drawings are also designated by the same reference, eliminating descriptions. The equipment body 2 itself is shown only a main structure. In addition, the exhaust ventilation holes 10, the air intake holes 16a and 16b, and the intake ventilation holes 13 are composed of an array of many through holes, but, here, for clarify, each of them is represented as one large through hole.

In the used state shown in FIG. 7(a), the front surface side of the equipment body 2 is protruded from the case 3, so that the air intake ports 16b, provided on the bottom surface 2d of the equipment body 2, communicates with the intake ventilation holes 13, provided on the bottom 3b of the case 3. As shown by a broken arrow, cool air is sucked into the equipment body 2 from outside through the intake ventilation holes 13 and the air intake port 16b.

In addition, the rear side of the equipment body 2 is substantially not shielded and is opened, and the exhaust ventilation holes 10 provided on the top surface 3a of the case 3 are also opened. Thereby, the cool air sucked from the ventilation fan 27 absorbs the heat generated in the equipment body 2, and, as shown by broken arrow, the air is emitted from the rear side 2e of the equipment body 2, and, further, the air is exhausted outside through the exhaust ventilation holes 10 of the case 3.

In the not used state shown in FIG. 7(b), the projector 1 is in the state in which the equipment body 2 is pushed into the case 3. Thus, the air intake ports 16a and 16b on the equipment body 2 are closed by the bottom 3b of the case 3, and the intake ventilation holes 13 and the exhaust ventilation holes 10 on the case 3 are also closed by the bottom surface 2d and the top surface 2b of the equipment body 2, respectively.

Then, the states of FIG. 1(a) and 1(b) are compared. Now, if the distance between the ventilation fan 28 and the exhaust ventilation holes 10 of the case 3 in the not used state shown in FIG. 7(b) is determined to be "L" and the protruded distance of the equipment body 2 from the case 3 in the used state shown in FIG. 7(a) is determined to be ΔL, the distance between the ventilation fan 28 and the exhaust ventilation holes 10 of the case 3 in the used state shown in FIG. 7(a) becomes L+ΔL, so the ventilation fan 28 further departs from the exhaust ventilation holes 10 by ΔL. Thus, the noise of the rotation of the ventilation fan 28 emitted from the exhaust ventilation holes 10 can be reduced.

As for the intake side of the cool air, since the air intake ports 16a and 16b and the intake ventilation holes 13 are provided on the bottom side of the liquid crystal projector 1, the effect of the noise emitted from them is small.

In addition, in the not used state, as shown in FIG. 7(b), the whole of equipment body 2 is pushed into the case 3, thereby, the whole size of the liquid crystal projector 1 becomes smaller than in the used state, being not bulky and easily to be carried or stored.

Further, in the not used state, since the equipment body 2 is shielded from ambient air, the liquid crystal projector 1 can be protected from moisture or dust, notwithstanding the environment where it is carried or the environment where it is stored.

Thus, according to the first embodiment, in the used state, the noise generated by the ventilation fan 28 can be effectively reduced by enlarging the distance between the ventilation fan 28 and the exhaust ventilation holes 10 for discharging air outside, and, in the not used state, the whole of liquid crystal projector 1 becomes small and easy to be carried or stored, while it can effectively protect the intrusion of moisture or dust from outside.

In the first embodiment, cool air is sucked from outside from the front side of the bottom surface, and exhausted outside from the rear side of the top surface. FIG. 8 is schematic perspective views showing other examples of other air intake positions and air exhaust positions. Here, with regard to a liquid crystal projector 1, an air intake position and an air exhaust position are shown by arrows, reference number 1a denotes a front surface of the liquid crystal projector 1, 1b a top surface, 1c a rear surface, 1d side surfaces, and 1e a bottom surface.

FIG. 8(a) shows examples where air is sucked from the front surface 1a, and the air is exhausted from the rear surface 1c (A-1), from the top surface 1b near neighbor side of the rear surface 1c (A-2) on the top surface 1b (A-2), and from the side surface 1d near the neighbor of the rear surface 1c (A-3) on the side surface 1d (A-3), respectively.

FIG. 8(b) shows examples where air is sucked from the bottom surface 1e, and the air is exhausted from the front surface 1a (B-1: air is sucked from the bottom surface 1e near the neighbor of the rear surface 1c), from the rear surface 1c (B-2: air is sucked from the bottom surface 1e near the neighbor of the front surface 1a), and from the side surface 1d (B-3: air is sucked from the bottom surface 1d near the neighbor of the front surface 1a, the air is exhausted from the side surface 1d near the neighbor of the rear surface 1c; alternatively, not shown, air may be sucked from the bottom surface 1d near the neighbor of the rear surface 1c, the air may be exhausted from the side surface 1d near the neighbor of the front surface 1a), respectively.

FIG. 8(c) shows examples where air is sucked from the rear surface 1c, and the air is exhausted from the front surface 1a (C-1), from the top surface 1b near the neighbor of the rear surface 1c (C-2), and from the side surface 1d near the neighbor of the rear surface 1c (C-3), respectively.

All of the examples are composed of an equipment body and a case shown in the preceding drawings. Therefore, in the used state, the distance between a ventilation fan and a exhaust ventilation fan is enlarged, in each of examples A-1 to A-3 shown in FIG. 8(a), and in each of examples B-2 and B-3 shown in FIG. 8(b), and the distance between a ventilation fan and an intake ventilation fan is enlarged, in an example B-1 shown in FIG. 8(b), and in each of examples C-1 to C-3 shown in FIG. 8(c). Thus, the noise from the exhaust ventilation holes and the intake ventilation holes can be reduced.

In the examples A-1 to A-3 shown in FIG. 8(a), the distance between the air intake port and the ventilation fan is not changed, and in the examples B-1 shown in FIG. 8(b) and C-1 shown in FIG. 8(c), the distance between the air exhaust port and the ventilation fan is not changed between the in the used state and the not used state of the liquid crystal projector 1. The air intake port and air exhaust port are, however, disposed on the front surface side of the liquid crystal projector 1, and noise emitted from them is directed towards the screen, thus the influence to the viewers of the screen is reduced.

In addition, in the examples C-2 and C-3, shown in FIG. 8(c), a ventilation path for circulating the sucked air is formed in the projector 1 so as to effectively cool the projection means, and the cool air, sucked from the intake ventilation holes on the rear surface 1c of the liquid crystal projector 1, passes through the ventilation path. Thus, the air with absorbed heat is exhausted from the exhaust ventilation holes provided on the top surface 1b or on a rear side part of the side surface 1d of the liquid crystal projector 1. In this case, an air intake fan is provided on the side of intake ventilation holes, and an air exhaust fan is provided on the side of exhaust ventilation holes, for smoothly circulating air. These fans are provided on the equipment body of the liquid crystal projector 1, and, as described above, in the used state, since the equipment body travels with respect to the case, and thereby a part of the equipment body is protruded from the case, the distances between the intake ventilation holes and the air intake fan, and between the exhaust ventilation holes and the air exhaust fan are elongated respectively, thus, the noise from the intake ventilation holes and the exhaust ventilation holes can be reduced. In addition, in the not used state, the liquid crystal projector 1 can be made small and the exhaust ventilation holes can be closed.

Further, in the example A-1 shown in FIG. 8(a) or B-2 shown in FIG. 8(b), a shielding part is provided at the part opposite to the exhaust ventilation holes provided on the rear surface of the case 3 in the rear portion 2e (FIG. 7) of the equipment body 2 and the remaining part is opened and used as air exhaust holes. In the not used state shown in FIG. 7(b), the exhaust ventilation holes are closed by the shielding part. Therefore, the intrusion of by moisture or dust from the exhaust ventilation holes can be protected, in the not used state. This is similar to the examples C1 to C3 shown in FIG. 8(c), so, the intrusion of moisture or dust from the intake ventilation holes provided on the rear surface of the case can be protected, in the not used state.

Figure 9:
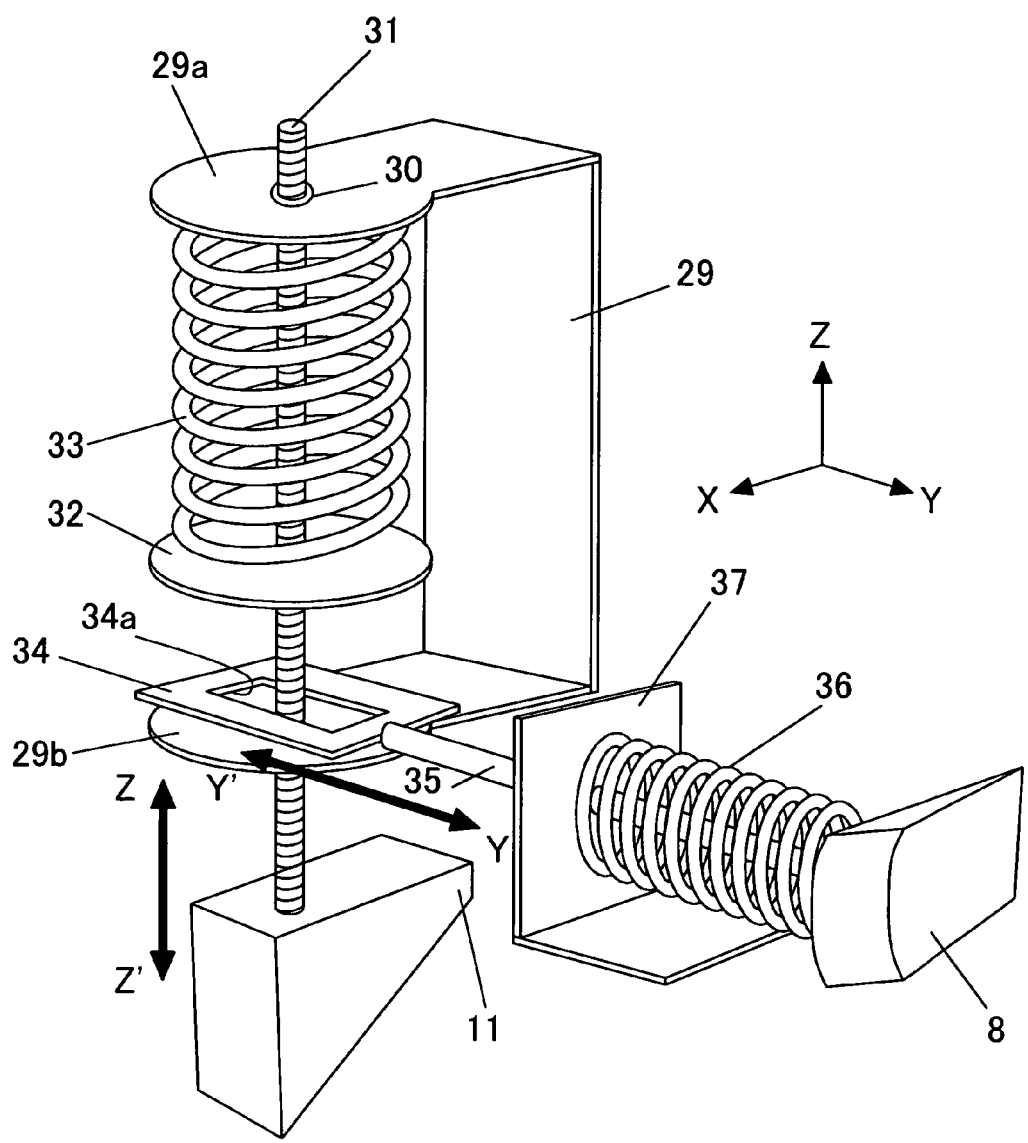
FIG. 9 is perspective view showing an example of attaching mechanism of attitude control legs.

FIG. 9 is a structural view showing an example of attaching mechanism of the attitude control legs 11 shown in FIG. 2. Reference number 29 denotes a body fixing part, 29a and 29b holding parts, 30 a through hole, 31 a screw shaft, 32 a holding member, 33 a compression spring, 34 a lock member, 34a an engagement part, 35 a connection shaft, 36 a compression spring, and 32 a holding member. Parts corresponding to the parts shown in the preceding drawings are also designated by the same symbols, eliminating duplicated descriptions. In addition, a X direction is a longitudinal direction of the liquid crystal projector 1 shown in FIG. 2 (the traveling direction of the equipment body 2 with respect to the case 3), a Y–Y' direction is the width direction of the same, and a Z–Z' direction is the thickness direction of the same.

The body fixing part 29 is fixed in the equipment body 2, and both ends are folded in a square bracket shape and constitute the holding parts 29a and 29b for holding the screw shaft 31. The holding parts 29a and 29b have a through hole 30 (not shown in the holding part 29b) and are arranged in a vertical direction (the Z–Z' direction). The holding part 29a is disposed on a top surface side of the equipment body 2, and the holding part 29b is disposed on a bottom surface side of the same, respectively. In addition, the screw shaft 31 is passed through the through holes 30, and therefore, the longitudinal direction of the screw shaft 31 becomes the Z–Z' direction, and the screw shaft 31 is movably hold by the holding parts 29a and 29b in the vertical direction (the Z–Z' direction).

An end, in the holding part 29a side, of the screw shaft 31 is fixed to the attitude control legs 11, and a holding member 32 (for example, disk) is fixed and attached to the screw shaft 31 between the holding parts 29a and 29b.

A compression spring 33 is provided between the holding member 32 and holding part 29a, and arranged so that the screw shaft 31 passes through a substantial central axis of the compression spring 33. One end of the compression spring 33 is fixed to the holding part 29a, while the other end is only placed on the holding member 32. On account of the compression spring 33, the holding member 32 is biased in a direction away from the holding part 29a, that is, in a direction (toward Z') where the attitude control legs 11 goes away from the holding part 29a through the screw shaft 31.

In addition, the screw shaft 31 passes through a frame-shaped lock member 34 between the holding members 29a and 29b. The lock member 34 is connected to the release button 8 by a connection shaft 35 passing through a through hole of a holding member 37 fixed to the equipment body 2. The lock member 34, the connection shaft 35, and the release button 8 are disposed in the Y–Y' direction and attached together so that they can travel in the Y–Y' direction together. The connection shaft 35 is supported by a bearing, not shown, and thereby, the positional relation, in the vertical direction (the Z–Z' direction) between the lock member 34 and the holding parts 29a and 29b, is fixed. In addition, a compression spring 36 is attached between the release button 8 and the holding member 37 so that the connection shaft 35 passes through the compression spring. So, the release button 8 is biased toward Y direction in which the button tends go away from the holding member 37.

An engagement part 34a is provided on an inner surface of the frame-shaped lock member 34 opposite to an attached part of the connection shaft 35. On account of an urging force of the compression spring 36, the lock member 34, the connection shaft 35, and the release button 8 are biased in the maximum traveled state toward the Y direction. At this time, the engagement part 34a of the lock member 34 engages with a root between threads of the screw shaft 31, to make the shaft fixed with respect to the body fixing part 29. Thereby, the attitude control legs 11 are kept locked with respect to the liquid crystal projector 1. In addition, as shown in FIG. 4, the release button 8 is protruded from the side surface 2c of the equipment body 2.

When the release button 8 is pushed with the attitude control legs 11 being locked, the connection shaft 35 and the lock member 34 travel against the force exerted by the compression spring 36 toward the Y' direction opposite to the Y direction, and the engagement part 34a are disengaged from the screw shaft 31. Thereby, the holding member 32 is pushed by the force applied by the compression spring 33, and the screw shaft 31, and therefore, the attitude control legs 11 travel toward the Z' direction in which the attitude control legs 11 go away from the holding member 29b. Thereby, as shown in FIG. 2, the attitude control legs 11 protrude from the bottom surface of the liquid crystal projector 1.

When the liquid crystal projector 1 is placed on a table etc. to fix the vertical position of the attitude control legs 11 and then a front surface side of the liquid crystal projector 1 is pushed toward the Z' direction from the upper side with the release button 8 pushed (accordingly, with the lock, of the screw shaft 31 by the lock member 34, released), the front surface side of the liquid crystal projector 1 is lowered toward the Z' direction and the body fixing part 29 and the holding member 37 fixed to the equipment body 2 also are lowered toward the Z' direction and at the same time, the lock member 34, the connection shaft 35, the compression spring 36, and the release button 8 also are lowered. In addition, as the body fixing part 29 is lowered, the compression spring 33 is compressed to the holding member 32 fixed to the screw shaft 31 by the holding part 29a. When the pushing of the release button 8 is released, the engagement part 34a engages with a root of the screw shaft 31, and the height of the front surface side of the liquid crystal projector 1 is set to new height such determined.

In addition, when the liquid crystal projector 1 is in such pushed state, the compression spring 33 is in a compressed state, because the height of the holding member 32 is kept constant. Thereby, when the release button 8 is pushed in such situation, the engagement part 34a of the lock member 34 is disengaged from the root of the screw shaft 31. Therefore, the lock by the lock member 34 is released, and the body fixing part 29 etc., and therefore the front surface side of the liquid crystal projector 1 is raised toward the Z direction by the biasing force of the compression spring 33.

Figure 10:
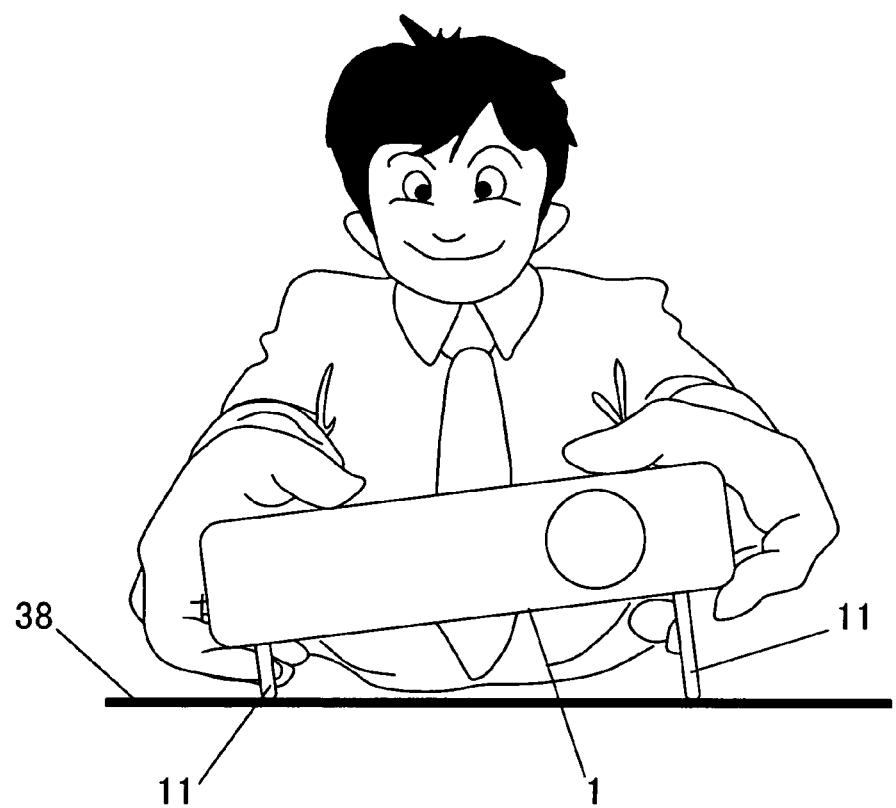
FIG. 10 is a view schematically showing an example of the method of controlling attitude of the first embodiment.
Figure 11:
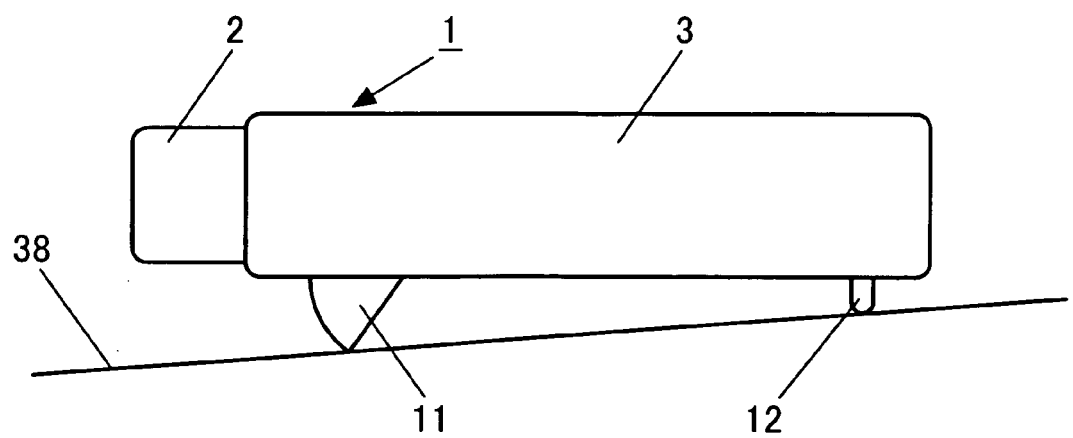
FIG. 11 is a view showing a longitudinal attitude of the first embodiment.
Figure 12A:
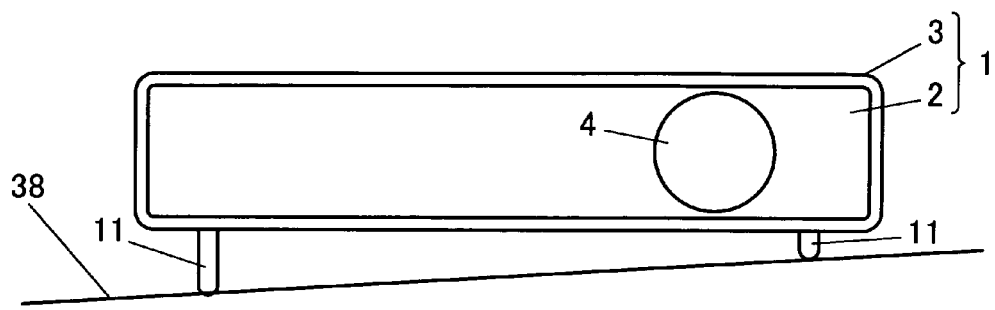
FIG. 12 is views showing the states of the attitude control when a plane on which the first embodiment is placed is inclined in the width direction of the projector.
Figure 12B:
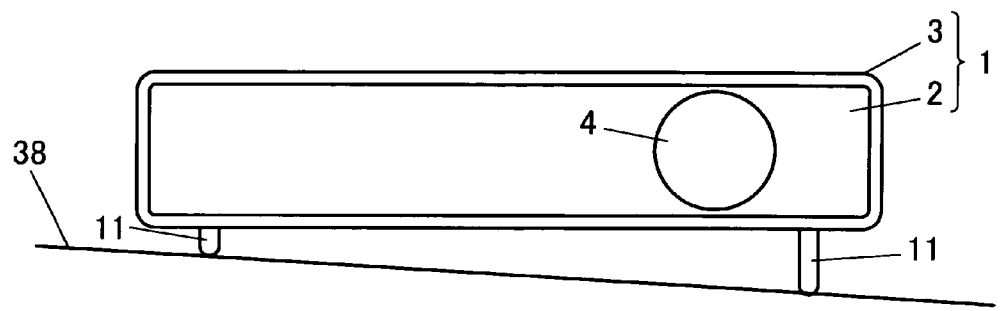

In this manner, the height of the front surface side of the liquid crystal projector 1 can be adjusted, by operating the release button 8 and pushing the front surface side of the liquid crystal projector 1 onto the mounting plane 5. In addition, as shown in FIG. 2, since the attitude control legs 11 provided on both sides of width direction of the front surface side of the bottom of the liquid crystal projector 1 are provided with respective release buttons 8, as shown in FIG. 4, they can be independently adjusted in the protruding height, from the bottom of the liquid crystal projector 1, respectively. Accordingly, as shown in FIG. 10, the front surface height of the liquid crystal projector 1 can be adjusted, by a user operation in which the release button 8 is operated and the front surface side of the liquid crystal projector 1 is pushed onto a mounting plane 38 with the front surface side of the liquid crystal projector 1 being held. As shown in FIG. 11, inclination with respect to the mounting plane 38 in the longitudinal direction of the liquid crystal projector 1 can be appropriately set. In addition, as shown in FIGS. 12(a) and 12(b), even if the mounting plane 38 of the liquid crystal projector 1 is inclined in the width direction of the liquid crystal projector 1, the attitude of the attitude control legs 11 in the width direction can be adjusted horizontally by adjusting the protruded height of the individual attitude control legs 11 from the liquid crystal projector 1.

Figure 13A:
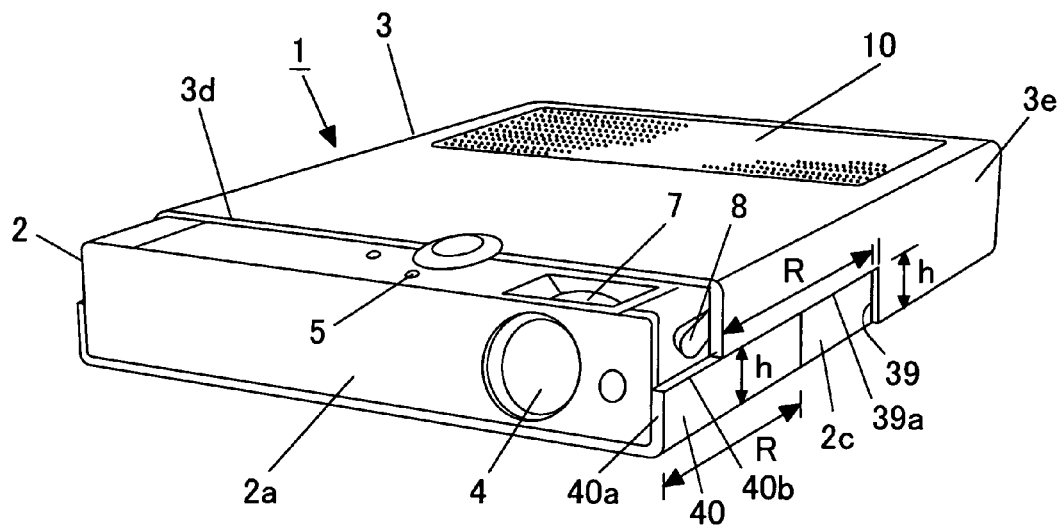
FIG. 13 is perspective views of a second embodiment of a liquid crystal projector according to the present invention, wherein (a) shows a state when the projector is used and (b) shows a state when the projector is not used.

FIG. 13 is a perspective view showing a second embodiment of a liquid crystal projector according to the present invention. FIG. 13(a) shows the used state, and FIG. 13(a) shows the not used state. Reference number 3d denotes a front surface of the case 3, 3e side surfaces of the case 3, 39 a notch, 39a an upper side, 40 a fitting part, 40a a front end surface, and 40b a top end surface. Parts corresponding to the parts shown in the preceding drawings are designated by the same reference numbers, eliminating duplicated descriptions.

A part of the case 3 from the front surface 3d by a prescribed length R, and from a lower portion (lower half, for example) of one side surface 3e to a lower portion of the other side surface 3e through the bottom surface is cut away and with this, notches 39 with length R and height h are formed on the side surfaces 3e. In addition, the equipment body 2 is provided with a fitting part 40, with the length R and the height h, from the front surface 2a. The fitting part 40 has a shape which extends from the one side surface 2c of the equipment body 2 to the other side surface 2c through the bottom surface, and the front end 40a of the fitting part 40 is substantially flush with the front surface 2a of the equipment body 2.

Figure 13B:
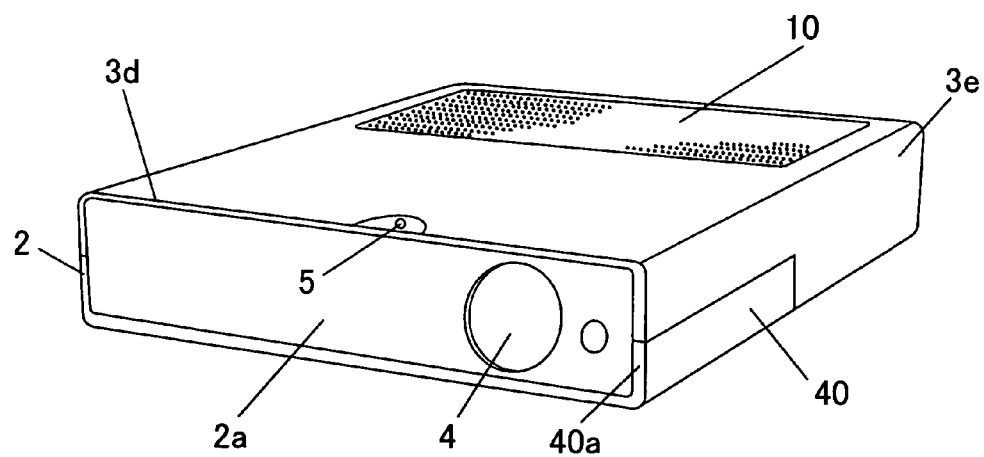

The side surface portions of the fitting part 40 fixed to the side surfaces 2c of the equipment body 2 are fitted into the notches 39 of the side surfaces 3e of the case 3. As the equipment body 2 travels with respect to the case 3, the upper ends 40b of the fitting part 40 slide on the upper side surfaces 39a of the notches 39. In addition, as shown in FIG. 13(a), when the equipment body 2 is pulled out of the case 3, and the front surface side of the equipment body 2 protrudes from the front surface 3d of the case 3 (that is, in the used state of the liquid crystal projector 1), the notches 39 of the case 3 are opened. However, as shown in FIG. 13(b), when the equipment body 2 is retracted into the case 3, and the front surface 2a of the equipment body 2 is substantially flush with the front surface 3d of the case 3 (that is, in the not used state of the liquid crystal projector 1), the notches 39 of the case 3 are closed by the fitting part 40 of the equipment body 2. Therefore, the fitting part 40 functions as a part of the case with respect to the equipment body 2.

In this liquid crystal projector 1, an air inlet port, not shown, is provided at a position of the bottom surface of the equipment body 2 corresponding to the air inlet port 16b shown in FIG. 7. When the liquid crystal projector 1 is in the not used state and the notches 39 of the case 3 are closed by the fitting part 40 of the equipment body 2 shown in FIG. 13(b), the air inlet port is positioned on the deeper side than the position of the notches 39 of the case 3, thereby, closed by the bottom surface of the case 3. In contrast, when the liquid crystal projector 1 is in the used state shown in FIG. 13(a), the air inlet port on the bottom surface of the equipment body 2 is pulled out to the position of the notches 40 of the case 3, thereby opening the notches 40 resulting in the air inlet port being opened.

Thus, also in the second embodiment, the air inlet port provided on the bottom surface of the equipment body 2 is opened in the used state and closed by the case 3 in the not used state. In addition, since the other structure is the same as the first embodiment, the same advantage is also obtained in the second embodiment.

Figure 14:
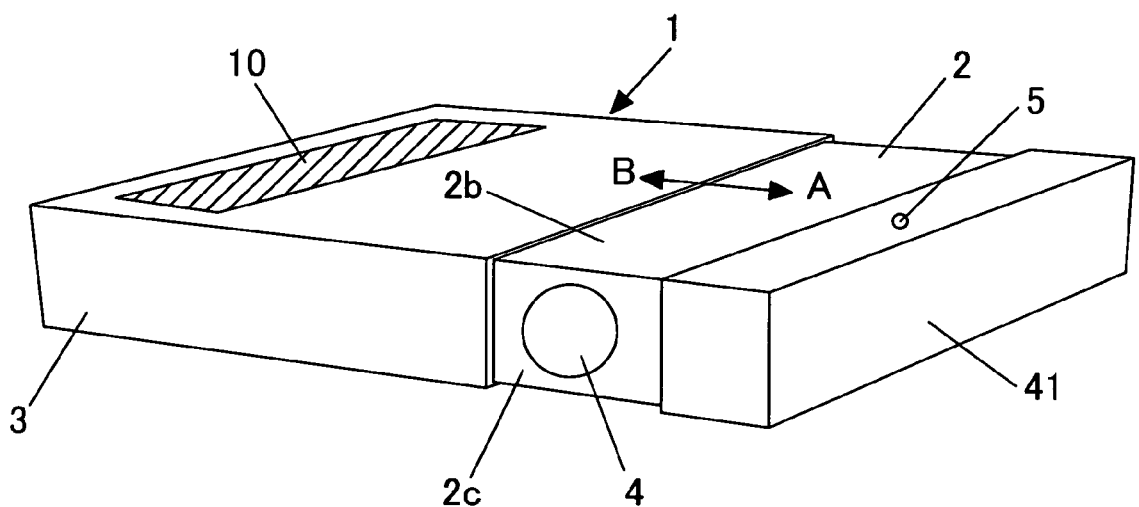
FIG. 14 is a perspective view of a third embodiment of a liquid crystal projector according to the present invention.

FIG. 14 is a perspective view showing a third embodiment of a liquid crystal projector 1 according to the present invention. Reference number 41 denotes a case part. Parts corresponding to the parts shown in the preceding drawings are designated by the same reference numbers, eliminating duplicated descriptions.

In the third embodiment, compared with the first embodiment shown in FIG. 1, the projection lens 4 is disposed on the side surface 2c of the equipment body 2, and a case part 41, with equal thickness and width to the case 3, is provided on the front surface side of the equipment body 2.

The state illustrated in FIG. 14 is the used state of the liquid crystal projector 1. By pushing the case 3 toward the case part 41 (that is, toward the direction of arrow A), the equipment body 2 is pushed into the case 3, and closed by the case 3 and the case part 41 with the case 3 abutting against the case part 41. This state is the not used state.

In addition, pulling the case 3 with respect to the case part 41 in the direction of arrow B in this not used state, the equipment body 2 is pulled out from the case 3, and brought into the used state shown in FIG. 14. The top surface 2b protruded from the case 3 of the equipment body 2, is provided with the operation key, the lens knob, and so on shown in FIG. 1(a), and the top surface of the case part 41 is provided with the start button 5.

Since the other structure is the same as the first embodiment, the same advantage is obtained also in the third embodiment.

FIG. 15 is a perspective view showing a fourth embodiment of a liquid crystal projector according to the present invention. Reference number 42 denotes a duct and reference number 43 denotes exhaust ventilation holes. Also, similar to FIG. 8, reference number 1a denotes the front surface of the liquid crystal projector 1, 1b the top surface, and 1c side surfaces. Parts corresponding to the parts shown in the preceding drawings are designated by the same reference numbers.

The fourth embodiment is not similar to the first to third embodiments comprising a case and an equipment body, but has one housing in which provided is means for enlarging the distance between a contained ventilation fan and the exhaust ventilation holes (hereinafter, referred to as distance enlarging means).

Figure 15A:
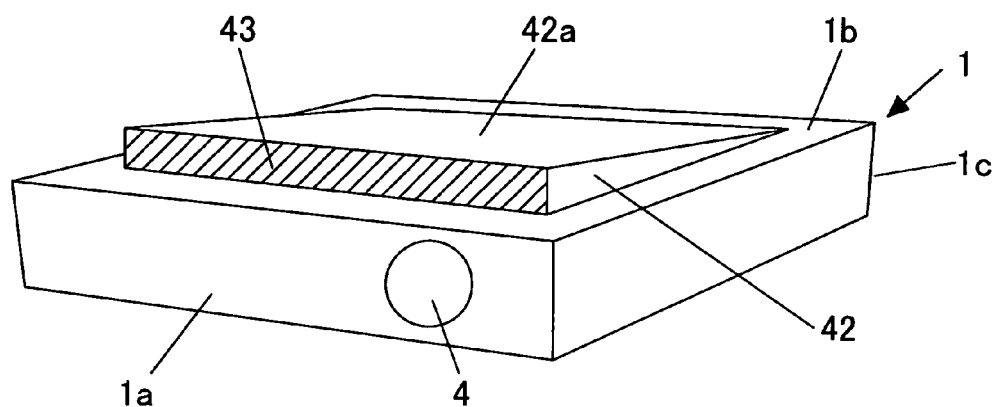
FIG. 15 is perspective views of a fourth embodiment of a liquid crystal projector according to the present invention.

The fourth embodiment shown in FIG. 15(a) has the distance enlarging means comprising a duct 42 on the top surface 1b of the housing of the liquid crystal projector 1. An opening of the duct 42 faces the front surface side of the housing of the liquid crystal projector 1, and the top surface 42a of the duct 42 is inclined so that it is lowered as it goes away from the front surface 1a of the housing. An opening is provided on a rear side of the top surface 1b of the housing of the liquid crystal projector 1, and communicates with the duct 42. Therefore, the distance from the ventilation fan (not shown) to the exhaust ventilation holes 43 is longer than the above-described embodiments by the distance from the opening to the exhaust ventilation holes 43.

The duct 42 may be fixed onto the top surface 1b of the housing, however, when the liquid crystal projector 1 is in the not used state, it can be designed to be pushed into the housing. When the liquid crystal projector 1 is pushed into the housing, the top surface 42a of the duct 42 is flush with the top surface 1b of the housing. In addition, when the liquid crystal projector 1 is in the not used state, it is brought into service by operating a start button, not shown. With this operation, the duct 42 protrudes from the housing to form a exhaust ventilation path, as shown.

Figure 15B:
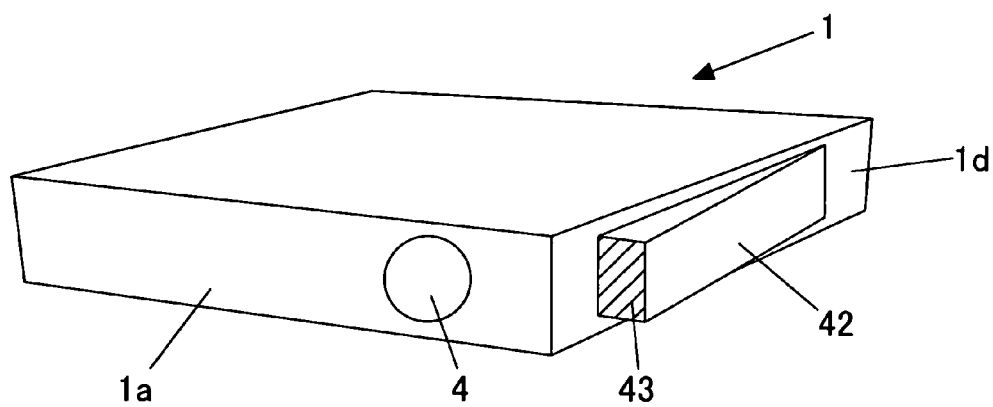

FIG. 15(b) shows a modification of the fourth embodiment in which the distance enlarging means comprising the duct is provided on the side surface 1d of the liquid crystal projector 1, and the structure is the same as that shown in FIG. 15(a).

According to the fourth embodiment, since the distance between the ventilation fan and the exhaust ventilation holes 43 can be comparatively long with the size kept small in the used state as well as in the not used state and the exhaust ventilation holes 43 can be disposed on the screen side, the noise can be reduced effectively. In addition, by the configuration in which the duct 42 can be pushed into the housing, the intrusion of moisture or dust can be prevented in the not used state.

Further, by providing the inside of the duct 42 with sound arresting material, the noise is further reduced.

Figure 16:
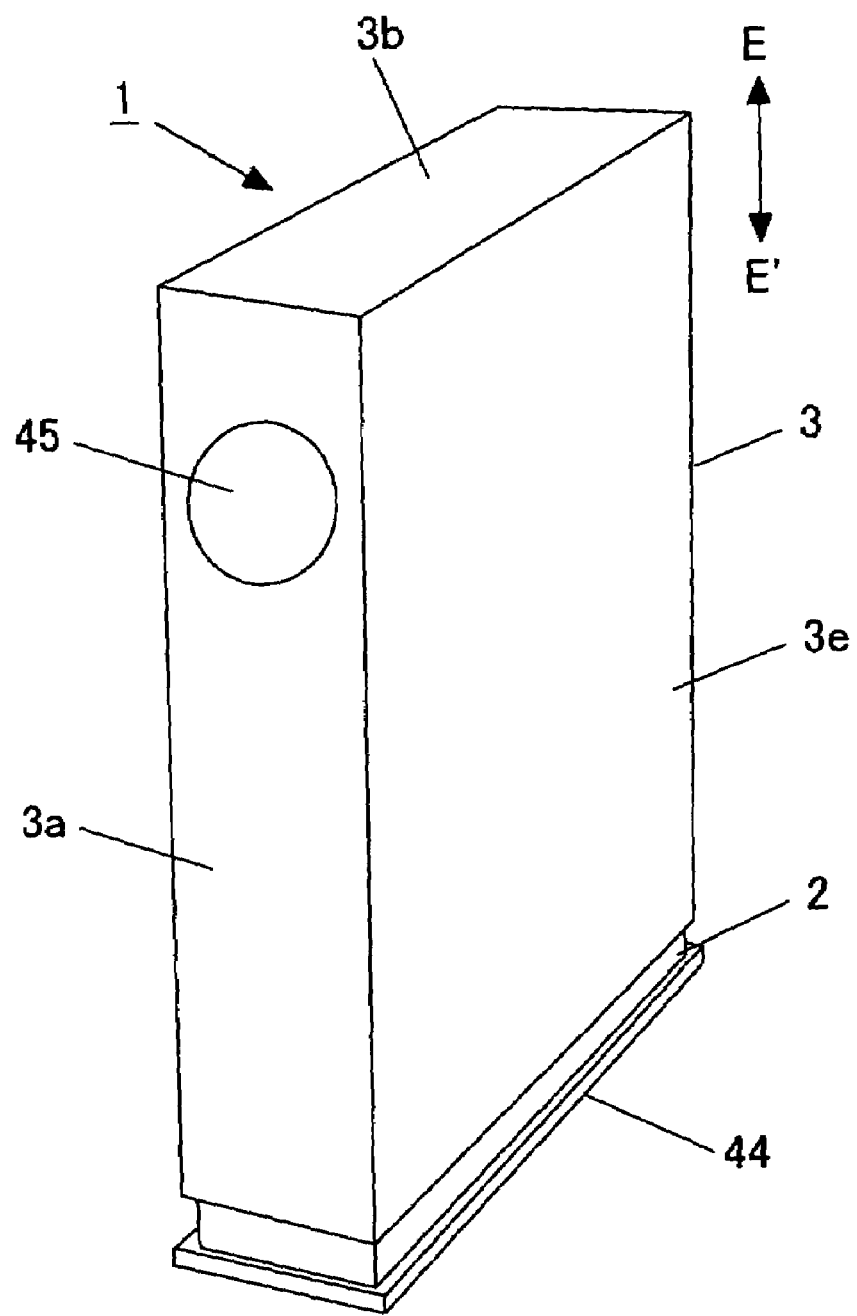
FIG. 16 is a perspective view of a fifth embodiment of a liquid crystal projector according to the present invention.

FIG. 16 is a perspective view showing a fifth embodiment of a liquid crystal projector according to the present invention. Reference number 44 denotes a support leg and reference number 45 denotes an opening. Parts corresponding to the parts shown in the preceding drawings are designated by the same reference numbers.

The above-described embodiments are ones used with the projector placed horizontally on the mounting plane such as a table. In the first to the third embodiments in which the projector comprises the equipment body 2 and the case 3, the case 3 travels with respect to the equipment body 2 in parallel with the mounting plane. However, in the fifth embodiment, the projector is used with the projector placed vertically.

The projector 1 comprising the equipment body 2 and the case 3 is used with itself placed vertically on a table plane etc., not shown. The equipment body 2 is provided with a support leg 44 on a bottom surface and the support leg 44 is placed on the mounting plane, not shown. When the liquid crystal projector 1 is not used, the whole of equipment body 2 except the support leg 44 is retracted into the case 3. When the projector 1 is placed on the mounting plane and a start button, not shown, provided on the top surface 3b or on the side surface 3e of the case 3, is operated, the case 3 is raised with respect to the equipment body 2 by a prescribed distance (arrow E direction). When the case 3 is raised by the prescribed distance, it is locked to the equipment body 2, and the liquid crystal projector 1 is brought into the used state. In addition, in the used state, when the case 3 is pushed from the upper side, the lock is released and the case 3 is lowered in the direction of arrow E'. When the whole of equipment body 2 except the support leg 44 is retracted into the case 3, the case 3 becomes locked to the equipment body 2. This is the not used state of the liquid crystal projector 1.

An opening 45 is provided in the front surface 3a of the case 3 at an upper location. When the liquid crystal projector 1 is in the used state, a central axis of the opening 45 aligns with an optical axis of the projection lens (not shown) provided on the equipment body 2 and an image can be magnified and projected to a screen (not shown) through the opening 45. In addition, operation means such as the operation key 6, and the lens knob 7, shown in FIG. 1, are provided on the top surface 3b or on the side surface 3e of the case 3, not shown.

In addition, there is provided an air intake port, not shown, on a portion adjacent to the support leg 44 and exposed from the case 3 in the used state of the equipment body 2. There is provided exhaust ventilation holes, not shown, on the top surface 3b, or an upper portion of the side surfaces 3e of the case 3. Though, air exhaust holes are provided on the top surface (inside the case 3) of the equipment body 2, the air exhaust holes do not face the exhaust ventilation holes provided on the case 3. When the liquid crystal projector 1 is not used, the air intake port is closed by the case 3, and the exhaust ventilation holes are also closed by the top surface (not shown) of the equipment body 2. When the liquid crystal projector 1 is used, the air intake holes are opened and the exhaust ventilation holes, provided on the case 3, further depart from the air exhaust holes of the equipment body 2, by the distance that the case 3 is raised in the direction of arrow E.

Thus, also in the fifth embodiment, similar to each of the above-described embodiments, when the projector is not used, it can be made small and the intrusion of moisture or dust etc. from the air intake holes or the air exhaust holes can be prevented. When the projector is used, the noise from the exhaust ventilation holes can be reduced.

With regard to the air intake holes, by providing intake ventilation holes on the lower portion of the front surface 3a of the case 3 and by providing the air intake holes on the front surface of the equipment body 2 so that the air intake holes align with the intake ventilation holes in the used state, when the liquid crystal projector 1 is not used, the air intake holes can be closed by the case. In addition, even in the used state, since the air intake holes faces the screen, the effect of noise emitted from them can be reduced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A liquid crystal projector, comprising:
    an equipment body containing projection means and cooling means and including an air intake port and an air exhaust port;
    a case for housing said equipment body; and
    a sliding device for sliding said case so as to take a first state in which said equipment body is pulled out of said case and a second state in which said equipment body is housed in said case, said air intake port and said air exhaust port being closed at said second state and opened outside at said first state,
    wherein said equipment body includes:
    attitude control legs provided on a front surface side of a bottom of said equipment body so as to protrude from and retract into the equipment body;
    a lock mechanism for locking or unlocking said attitude control legs; and
    release buttons for unlocking said lock mechanism, said release buttons being provided on said equipment body so that the release buttons are pushed and concealed by said case in said second state in which said equipment body is housed in said case and the release buttons are released from being pushed by said case to be exposed in said first state in which said equipment body is pulled out of said case.

2. A liquid crystal projector according to claim 1, wherein said equipment body comprises an air duct which opens said air intake port and said air exhaust port outside at said first state.

3. A liquid crystal projector according to claim 2, wherein said air intake port is provided on a bottom surface of said equipment body and said air exhaust port is provided on a rear portion of said equipment body, and
    said case comprises intake ventilation holes for opening said air intake port outside through said air duct and exhaust ventilation holes for opening said air exhaust port outside through said air duct.

4. A liquid crystal projector according to claim 3, wherein said exhaust ventilation holes are provided on a rear surface side of a top surface, a rear surface side of side surfaces, or rear surface of said case, and
    said intake ventilation holes are provided on a front surface side of a bottom surface of said case.

5. A liquid crystal projector according to claim 1, wherein said case includes a notch extending from a part of one side surface to a part of another side surface of said case through a bottom surface, and
    said equipment body includes a fitting part which fits into said notch, and travels along said notch as said case travels with respect to said equipment body.

6. A liquid crystal projector according to claim 1, wherein said case comprises a case body for housing said equipment body and a case part provided on a front surface of said equipment body.

7. A liquid crystal projector according to claim 1, wherein said projection means comprises a projection lens, an optical device disposed in the vicinity of said projection lens, a light source disposed in the vicinity of said optical device and a ventilation fan disposed in the vicinity of said light source, and
    said optical device comprises an optical element disposed on a rear side of said projection lens and a display panel disposed in the vicinity of said optical element.

\* \* \* \* \*